US009664351B2

(12) United States Patent
Bauer et al.

(10) Patent No.: US 9,664,351 B2
(45) Date of Patent: May 30, 2017

(54) VEHICLE HEADLIGHT WITH LASER LIGHT SOURCE

(71) Applicant: ZIZALA LICHTSYSTEME GMBH, Wieselburg (AT)

(72) Inventors: Friedrich Bauer, Bergland (AT); Andreas Moser, Haag (AT); Johann Altmann, Gmünd (AT); Erich Kaufmann, Linz (AT); Christian Jackl, Ruprechtshofen (AT)

(73) Assignee: ZKW GROUP GMBH, Wieselburg an der Erlauf (AT)

( * ) Notice: Subject to any disclaimer, the term of this patent is extended or adjusted under 35 U.S.C. 154(b) by 193 days.

(21) Appl. No.: 14/382,255

(22) PCT Filed: Mar. 12, 2013

(86) PCT No.: PCT/AT2013/050064
§ 371 (c)(1),
(2) Date: Aug. 29, 2014

(87) PCT Pub. No.: WO2013/134807
PCT Pub. Date: Sep. 19, 2013

(65) Prior Publication Data
US 2015/0043233 A1    Feb. 12, 2015

(30) Foreign Application Priority Data

Mar. 12, 2012    (AT) .............. A 50073/2012

(51) Int. Cl.
*B60Q 1/10*    (2006.01)
*F21S 8/10*    (2006.01)
*B60Q 1/04*    (2006.01)
*B60Q 11/00*    (2006.01)
*B60Q 1/00*    (2006.01)
(Continued)

(52) U.S. Cl.
CPC ........ *F21S 48/1225* (2013.01); *B60Q 1/0023* (2013.01); *B60Q 1/04* (2013.01);
(Continued)

(58) Field of Classification Search
CPC ...... B60Q 1/0023; B60Q 1/0047; B60Q 1/10; B60Q 1/04; B60Q 1/0052; F21S 48/1225;
(Continued)

(56) References Cited

U.S. PATENT DOCUMENTS 3,404,350 A * 10/1968 Muncheryan ......... H01S 3/0007
219/121.6
6,540,388 B2 * 4/2003 Aida .................... F21S 48/1109
313/318.12
(Continued)

FOREIGN PATENT DOCUMENTS

DE    102007050924 A1    5/2009
DE    102011007123 A1    10/2012
(Continued)

OTHER PUBLICATIONS

First Office Action dated Jan. 18, 2013 of Austrian priority Application No. A 50073/2012.
Written Opinion dated Jun. 24, 2014 of PCT/AT2013/050064.

*Primary Examiner* — Hargobind S Sawhney
(74) *Attorney, Agent, or Firm* — Eversheds Sutherland (US) LLP

(57) ABSTRACT

The invention relates to a light source module (1) for a vehicle headlight (2), wherein the light source module (1) has at least one laser light source (3) and at least one luminous element (4) which can be excited by illumination with laser light to emit visible light and which can be irradiated by the laser light source (3), wherein the laser light source (3) and the luminous element (4) are arranged spaced apart from one another on a carrier element (5) and light source module (1) has means (5', 6'; 5", 6") which are arranged on the carrier element (5) in order to be detachably mounted in the vehicle headlight. The invention also relates to a vehicle headlight (2) with at least one such light source module (1).

23 Claims, 3 Drawing Sheets

(51) Int. Cl.
*F21K 9/61* (2016.01)
*F21K 9/64* (2016.01)
*F21W 101/10* (2006.01)
*F21Y 115/30* (2016.01)
*F21Y 115/10* (2016.01)

(52) U.S. Cl.
CPC ............... *B60Q 1/10* (2013.01); *B60Q 11/00* (2013.01); *F21K 9/61* (2016.08); *F21K 9/64* (2016.08); *F21S 48/1109* (2013.01); *F21S 48/1145* (2013.01); *F21S 48/1154* (2013.01); *F21S 48/1241* (2013.01); *F21S 48/13* (2013.01); *F21S 48/1323* (2013.01); *F21S 48/1388* (2013.01); *F21S 48/31* (2013.01); *F21S 48/323* (2013.01); *F21S 48/328* (2013.01); *F21W 2101/10* (2013.01); *F21Y 2115/10* (2016.08); *F21Y 2115/30* (2016.08)

(58) Field of Classification Search
CPC .............. F21S 48/1241; F21S 48/1341; F21S 48/1388; F21S 48/1208; F21S 48/125; F21S 48/215; F21S 48/31; F21S 48/321; F21S 48/328; F21S 48/10; F21S 48/115; F21S 48/1104; F21S 48/12; F21K 9/64; F21V 23/0442; F21V 29/20; F21V 9/16; F21W 2101/01; F21W 2101/10; F21Y 2115/30; H01S 3/0007; H01S 3/025; H01S 5/4025

See application file for complete search history.

(56) References Cited

U.S. PATENT DOCUMENTS

| | | | | |
|---|---|---|---|---|
| 8,641,232 | B2* | 2/2014 | Kawashima | F21V 19/0055 362/249.01 |
| 2005/0105301 | A1* | 5/2005 | Takeda | F21S 48/1154 362/545 |
| 2005/0134527 | A1 | 6/2005 | Ouderkirk et al. | |
| 2010/0067248 | A1* | 3/2010 | Frey | F21S 48/1104 362/538 |
| 2011/0063115 | A1* | 3/2011 | Kishimoto | F21K 9/00 340/600 |
| 2011/0194302 | A1* | 8/2011 | Kishimoto | F21S 48/1154 362/511 |
| 2011/0249460 | A1* | 10/2011 | Kushimoto | B60Q 1/085 362/510 |
| 2011/0279999 | A1* | 11/2011 | Takahashi | G02B 6/34 362/84 |
| 2011/0280032 | A1* | 11/2011 | Kishimoto | F21S 48/115 362/538 |

FOREIGN PATENT DOCUMENTS

| | | |
|---|---|---|
| JP | 2004241142 A | 8/2004 |
| JP | 2012009380 A | 1/2012 |
| WO | 2005044947 A2 | 5/2005 |
| WO | 2006066530 A1 | 6/2006 |
| WO | 2008000222 A1 | 1/2008 |

* cited by examiner

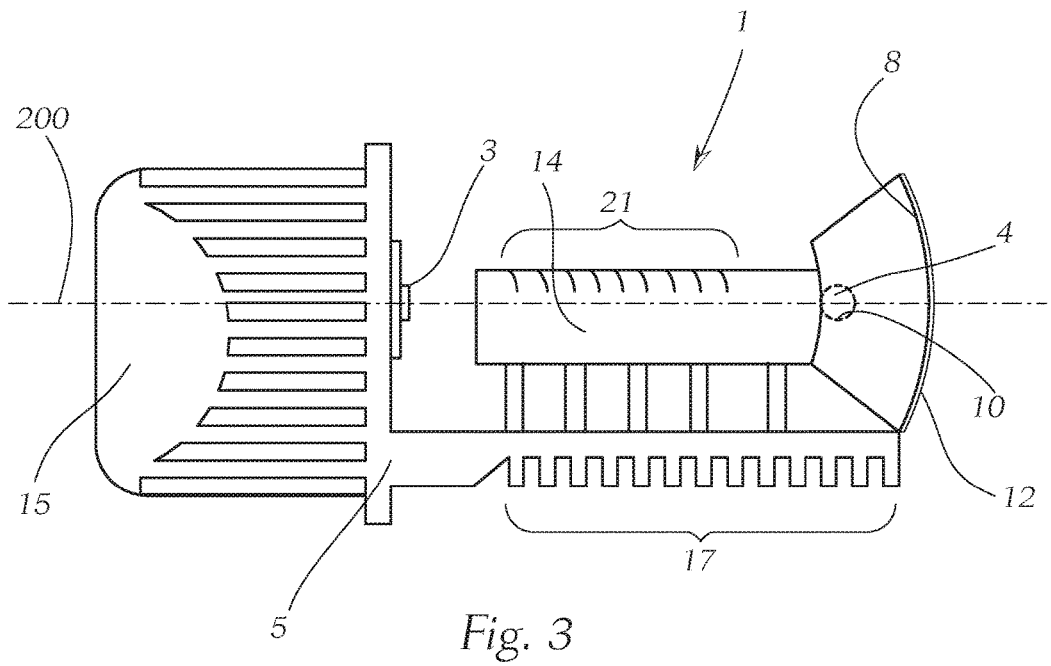
Fig. 3
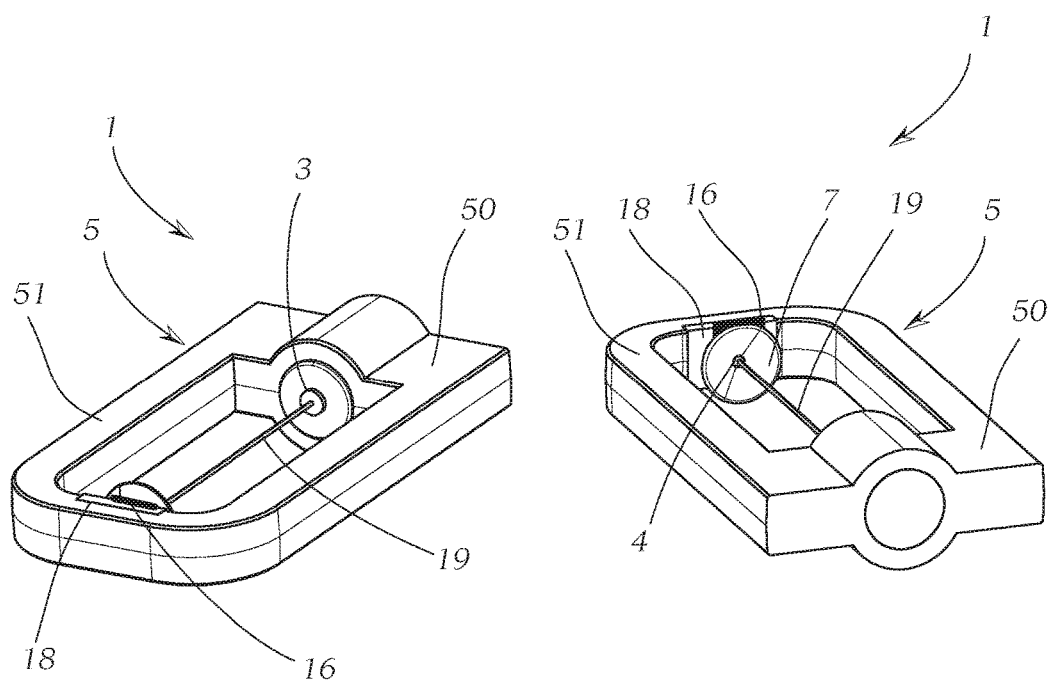
Fig. 4
Fig. 5

VEHICLE HEADLIGHT WITH LASER LIGHT SOURCE

The invention relates to a light source module for a vehicle headlight, wherein the light source module has at least one laser light source and at least one luminous element which can be excited by illumination with laser light to emit visible light and which can be irradiated by the laser light source, wherein the laser light source and the luminous element are arranged spaced apart from one another on a carrier element. The invention also relates to a vehicle headlight with at least one such light source module.

Various types of vehicle headlights are known in the prior art, in which light source modules, for example comprising discharge lamps or halogen light sources, are introduced and can be secured. Corresponding receptacles are usually provided in the reflectors or reflector adapters for this purpose.

The light source modules that are usual nowadays contain a light source and an ignition device, which form a common module and therefore can be mounted easily and in a reproducible manner and can be easily exchanged in the case of a malfunction. Here, it is ensured that, when using a new light source module, the light source is again located in the correct position, for example with respect to the reflector.

For energy-saving reasons and in order to reduce the spatial requirement of vehicle requirements of vehicle headlights, the use of laser light sources such as semiconductor lasers is being increasingly tested, since these are advantageous in this regard. In order to make the laser light usable for a vehicle headlight, a luminous element, or what is known as a phosphor, is irradiated by a laser light source and is thus excited to emit visible light. Solutions of this type are presented in US 2011/0157865 A1, US 2011/0194302 A1 and US 2011/0280033 A1.

The conventional light module solutions cannot be operated with such light sources. The object of the invention is therefore to provide a light source module that can be operated with a laser light source.

This object is achieved in accordance with the invention with a light source module as mentioned in the introduction in that the light source module has means which are arranged on the carrier element in order to be detachably mounted in the vehicle headlight.

The light source module according to the invention enables a standardised laser light source for vehicle headlights, wherein, due to the common arrangement of laser light source and luminous element on a carrier element, the positioning accuracy between laser light source and luminous element is ensured. Similarly to conventional modules, the light source module can be inserted from behind in the direction of the optical axis of a vehicle headlight or reflector thereof. Simple installation or exchange is thus also possible, wherein the reproducible positioning in particular of the luminous element within the vehicle headlight is ensured here. This exchangeability provides a resource-saving, economical handling possibility, especially since, in the case of a defect, only the light source module has to be exchanged, and not the entire headlight, as would be expected in the prior art. Routine checks, for example of the phosphor, can thus also be performed more easily.

For example, semiconductor lasers or laser diodes of the known type can be used as a laser light source, wherein the wavelength of the emitted light lies in the range from 200 nm to 450 nm. By way of example, the laser light source may also be a light source array comprising a plurality of light sources, in particular laser diodes. Here, a colour matching between the different light sources can be provided. The luminous element for example is any phosphor converter, wherein a feature common to all these materials is that they can be excited by laser light to emit visible light, in particular that is white in colour.

The carrier element can be configured arbitrarily, for example made of plastic. It is favourable if the carrier element is manufactured from a thermally conductive material and/or at least in part from a transparent material. Here, different conventional materials can be used, for example the carrier element can be produced by means of "aluminium die casting" or as a heat sink of known type comprising a heat pipe. Various metals, metal alloys or anthracite- or graphite-containing polymers are also possible. The material or the embodiment is to be selected such that heat dissipation away from the luminous element is ensured.

The heat produced during the operation of the laser light source or of the luminous element can thus be dissipated via the carrier element. The waste heat may be quite considerable, since laser light sources with outputs of currently up to 3 W are used, wherein some of the output is delivered in the form of heat. The heat dissipation is advantageous since the emission characteristic of a laser diode as used here is highly dependent on temperature, in contrast to LEDs.

With an embodiment of the carrier element at least partially made of a transparent material, the radiated laser light or the light originating from the luminous element can be deflected and therefore made visible in combination with irregularities (microstructures, material inclusions, etc.) formed in the carrier element or on the surface thereof. Laser light leaving the laser light source in an uncollimated manner is scattered and reflected in the transparent part of the carrier element so that the light may be perceived outside the vehicle headlight. By way of example, with use of a blue laser light source, a blue light not harmful to the eyes can thus be produced and can be used as a design element.

The light source module advantageously has detent elements, which cooperate with corresponding detent receptacles, wherein the detent elements can be arranged on the light source module and the detent receptacles can be arranged on the vehicle headlight (for example in the reflector or reflector adapter) or vice versa. Tongue-and-groove combinations are also possible, via which the light source module can be inserted into a vehicle headlight. Such means for detachable mounting are known to a person skilled in the art and therefore will not be discussed in greater detail. The light source module according to the invention, similarly to conventional modules, can thus be mounted in a vehicle headlight or reflector or reflector adaptor thereof.

In a variant of the invention, the luminous element is arranged on the carrier element in such a way that, in the mounted state, it can be arranged in a focal point of a reflector of the vehicle headlight. An optimal utilisation of the light emitted by the luminous element is thus ensured.

The light source module and/or the laser light source advantageously comprise reference means for referencing the light source module and/or the laser light source in a vehicle headlight, in particular a reflector of a vehicle headlight. It can thus be ensured that, when installing the light source module in a headlight, the optimal positioning of the module or luminous element thereof can be reproduced. In a variant of the invention, the reference means are formed as guide devices cooperating with corresponding guide receptacle devices of a vehicle headlight, in particular of a reflector of a vehicle headlight. In a further variant of the invention, the reference means are formed as a reference plane which is formed on the laser light source and/or on the carrier element and has at least three bearing surfaces, which cooperate with corresponding bearing surface receptacles on the vehicle headlight, in particular on the reflector of a vehicle headlight. In yet a further variant of the invention, the reference means are formed as at least one dowel pin and at least one dowel hole, wherein the dowel pin is arranged on the laser light source and/or the carrier element and the dowel hole is arranged on a vehicle headlight, or vice versa.

A concentrator optical element arranged on the carrier element is advantageously provided on the side of the luminous element facing away from the laser light source and shields the luminous element in the mounted state in the primary radiation direction of the vehicle headlight and/or has a reflection layer on the side thereof facing the luminous element. By way of example, the concentrator optical element may be manufactured here from glass, which is provided on the side thereof facing away from the laser light source with a light-impermeable coating.

The concentrator optical element may also be manufactured from plastic or metal, which are preferably impermeable to light. The light emitted by the luminous element is thus prevented from leaving the vehicle headlight in an uncontrolled manner in the primary radiation direction and is thus prevented from interfering with the light exposure. In addition, the concentrator optical element serves as a safety measure in accordance with this variant: as a covering cap it shields the laser light from the surrounding environment and prevents the exit of said laser light and therefore the endangerment of uninvolved road users. With provision of a reflection layer facing the luminous element, the light emitted by the luminous element on all sides (in particular in the direction leading away from the laser light source) is utilised and at the same time optically pre-formed (the concentrator optical element therefore functions as a reflector).

In a variant of the invention, the luminous element is arranged in an optical element arranged on the carrier element, preferably in a blind bore or in a cavity, wherein the optical element, at least on a side facing away from the laser light source, is assigned at least one reflection layer reflecting light in the direction of the laser light source and/or at least one light-impermeable absorption layer. The reflection layer and/or the light-impermeable absorption layer are applied preferably directly to the optical element. The optical element thus has a receptacle for the luminous element and a reflection layer and/or absorption layer in a common component.

Besides the embodiment as a blind bore, the recess can also be formed as a cavity, that is to say surrounded on all sides by the optical element. The luminous element is thus protected against ambient influences. For example, the optical element can be made of glass or transparent plastic so that the light of the laser light source can impinge on the luminous element. With provision of a light-impermeable coating, the optical element (as well as the concentrator optical element) acts as a covering cap for the laser light and the light emitted by the luminous element. This light-impermeable coating can also be used for example for design purposes, for example in order to place manufacturer logos.

The optical element or the concentrator optical element can be formed as free-form faces having at least one focal point. The reflective layers or the reflection layer applied thereto thus also have the form of a free-form face with the corresponding reflection characteristics. The converted light is pre-formed. The light of the luminous element radiated in the direction of the primary radiation direction of the vehicle headlight can thus be better utilised.

In a further variant of the invention, the side of the optical element facing the laser light source is covered at least in part, but particularly in a region below a horizontal plane running through the luminous element, by a light-impermeable screen device, for example in the form of a light-impermeable coating.

The screen device allows the generation of a light/dark transition, whereby various light functions, such as dipped beam, fog light, etc., can be provided. In the case of a dipped beam, it is necessary for example for the luminous element to be clearly defined geometrically and photometrically. The above-mentioned screen device is used for this purpose and is formed for example as a painted coating, a coating applied by vapour deposition, or a separate component. The screen device, together with accordingly formed reflection regions, means that the light emission reflected in the optical element exits above the luminous element and can thus be used for the vehicle headlight.

In principle, the specified invention is implemented as a free-beam concept, that is to say the laser light source radiates directly onto the luminous element. In a variant of the invention, at least one light guiding element is arranged between the laser light source and the luminous element. Here, this light guiding element consists of a light guiding material, for example plastic (for example Plexiglass), and can be formed arbitrarily, for example can be tubular, conical or cylindrical. An embodiment as a funnel-shaped concentrate element, for example made of glass, is also possible. The light guiding element can also be provided with irregularities (microstructures, roughened portions on the surface, scattering bodies in the interior, etc.), which deflect the laser light and thus illuminate the light guiding element, which can be used as a design element. By way of example, a blue glow can be produced with use of a blue laser light source.

In a variant of the invention, the carrier element has at least one carrier base with at least one laser light source and at least one carrier arm extending from the carrier base and comprising at least one luminous element. The carrier arm is favourably formed in a U shape starting from the carrier base, wherein the at least one luminous element is arranged on the side of the carrier arm facing the laser light source in the position furthest from the carrier base. A particularly compact light source module can thus be provided—the region in which the laser light beams runs is shielded by the U-shaped embodiment.

In order to dissipate the waste heat produced during operation of the laser light source, the laser light source is advantageously connected to at least one cooling element, which in particular is formed as a heat sink and/or ventilation device. The cooling element connected to the laser light source is favourably arranged on the carrier element. The cooling element can be formed for example as a water cooling system, fan unit or heat pipe, however an embodiment for example with cooling ribs is also possible. In one variant, the carrier element is thermally conductive as described above, such that a particularly efficient dissipation of the waste heat produced by the light source module is ensured in combination with the cooling element just described.

Malfunctions of the light source module, for example of the laser light source, may also lead to an endangerment of other road users in addition to disadvantages for operation. In a variant of the invention, at least one sensor element for detecting a malfunction of the laser light source and/or of the carrier element is therefore arranged on the carrier element. The sensor element is at least one of the following sensor devices: optical sensor for detecting a deviation of the laser light emitted by the laser light source from the normal direction of radiation; optical sensor for detecting malfunctions of the luminous element; mechanical sensor for detecting damage to the carrier element and/or to the luminous element and/or to the optical element and/or to the concentrator optical element.

The carrier element advantageously has an absorbing surface in the region around the luminous element. An additional safety function can thus be provided, since, in the event of a malfunction (for example when the orientation of the laser light source changes due to a shift of the source or, if possible, a break of the carrier element), the light is absorbed when the laser beam impinges away from the luminous element and is not reflected in an uncontrolled manner. An absorbing or non-reflective surface of this type is favourably provided for this purpose in the region in which the laser light may impinge in the case of malfunctions or in the vicinity of the luminous element.

In a variant of the invention, the light source module has at least one safety switch device, which prevents an activation of the light source module or of the laser light source of the light source module prior to complete installation of the light source module in a vehicle headlight. Here, said device may be a contact switch for example, which only releases the start-up of the laser light source in the correct position in the vehicle headlight or in a reflector of a vehicle headlight. Further possibilities are constituted by a coding resistor or a bridge which can be integrated in the cable loom or in the photometric unit (mechanically and/or electronically) and which only releases start-up when the headlight or the light module is/are installed in the vehicle.

The object of the invention is also achieved by a vehicle headlight of the type mentioned in the introduction with at least one light source module according to one of the above-described variants. In one variant of the invention, at least one reflector or reflector adapter is provided with at least one receptacle for the light source module. The vehicle headlight formed in this way is suitable for meeting the legal requirements of the ECE, SAE, CCC, etc.

As mentioned above, the receptacle here may comprise means for the detachable mounting of the light source module, that is to say for example may be provided with detent elements, which cooperate with detent receptacles on the light source module, or vice versa. Other solutions known to a person skilled in the art for releasable mounting are also possible.

The invention will be explained in greater detail hereinafter on the basis of a non-limiting exemplary embodiment, which is illustrated in the drawing, in which:

FIG. 1 schematically shows a side view of a first variant of the light source module according to the invention;

FIG. 2 schematically shows a side view of a second variant of the light source module according to the invention;

FIG. 3 schematically shows a side view of a third variant of the light source module according to the invention;

FIG. 4 shows a perspective view diagonally from the front of a fourth variant of the light source module according to the invention;

FIG. 5 shows a perspective view diagonally from the rear of the variant from FIG. 4;

Figure 1:
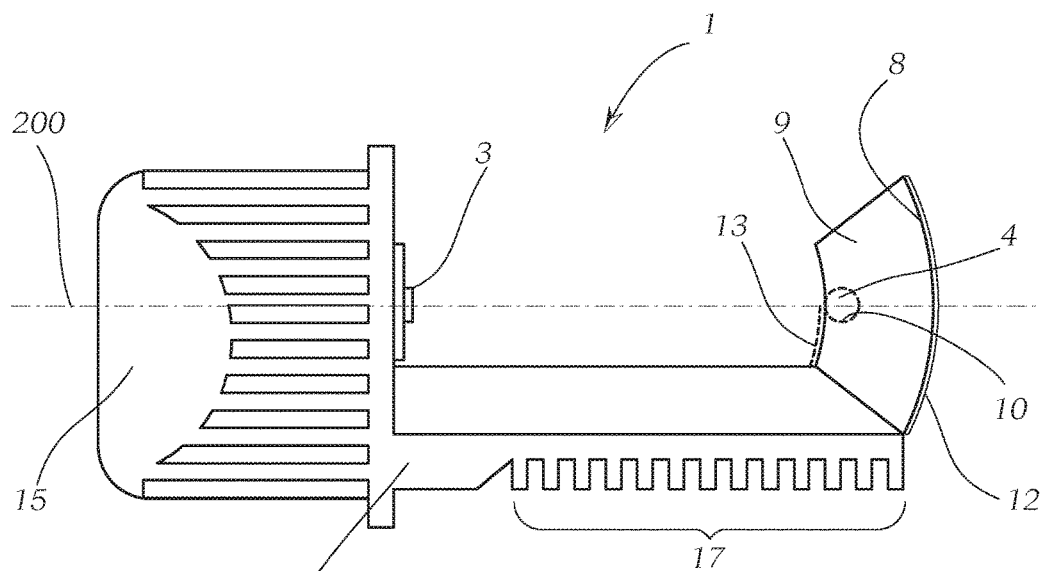
Figure 6:
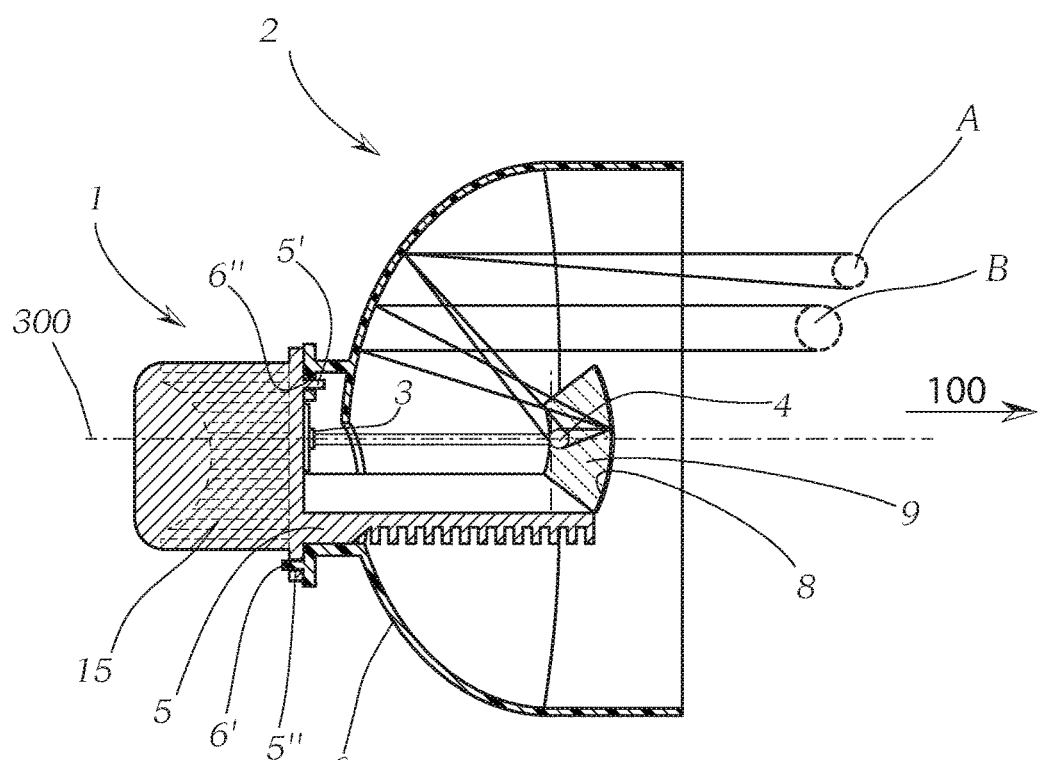
Figure 7:
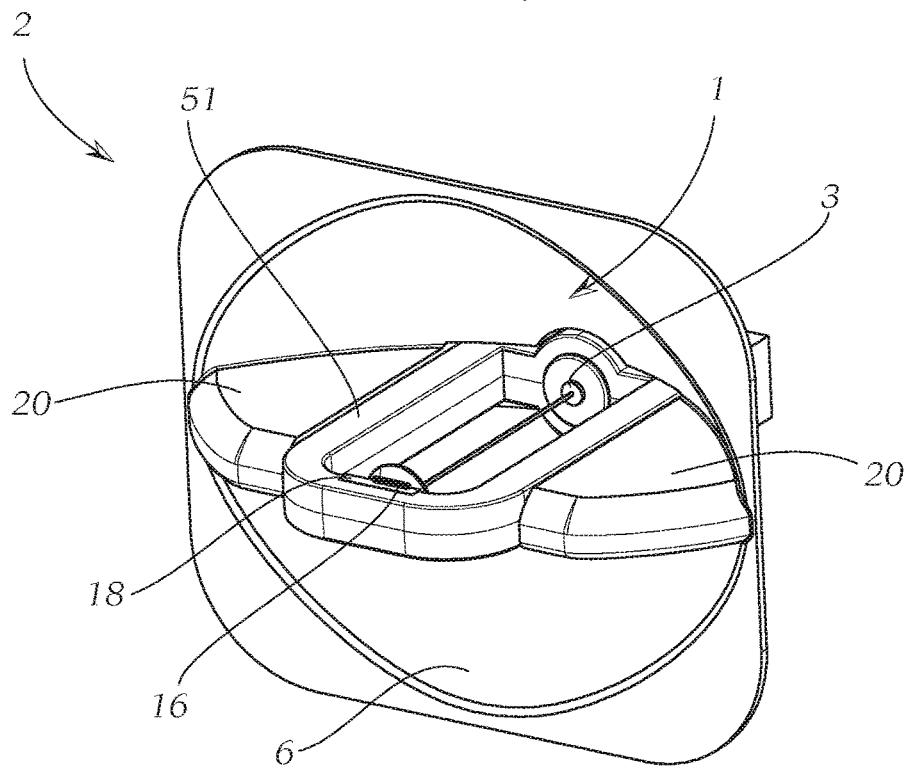

FIG. 6 schematically shows a lateral sectional view of a vehicle headlight with a light source module according to FIG. 1; and FIG. 7 shows a perspective view diagonally from the front of a vehicle headlight with a light source module according to FIG. 4.

For reasons of clarity, like elements are in each case denoted in the various figures by like reference signs.

FIG. 1 shows a first variant of a light source module 1 according to the invention, wherein a laser light source 3 and a luminous element 4 arranged at a distance and held in an optical element 9 are arranged on a carrier element 5. By way of example, the laser light source 3 is a semiconductor laser in the form of a laser diode or a light source array comprising a plurality of laser diodes inclusive of the necessary control electronics and wiring. With the provision of a plurality of laser light sources, these may be colour-matched, for example.

The carrier element 5 is manufactured from a thermally conductive material of known type (for example as a heat sink, comprising a heat pipe), that is to say dissipates the heat produced during operation of laser light source 3 and luminous element 4. The carrier element 5 can be provided for example by means of "aluminium die casting" or as a heat sink of known type comprising a heat pipe. Various metals, metal alloys or anthracite- or graphite-containing polymers are also possible. A variant in which the carrier element 5 is formed from glass material and contains embedded metal strips (for example copper) for heat conduction is also possible.

For assistance, cooling ribs 17 are provided on the underside of the carrier element 5 in the area surrounding the luminous element 4. The carrier element 5 can be manufactured in part from transparent material that has irregularities, such as microstructures, roughened portions or scattering bodies, in the interior thereof. Light leaving the laser light source 3 or the luminous element 4 is thus reflected and scattered and thus made visible from outside and can be used as a design element.

For thermal dissipation, the laser light source 3 is connected to a cooling element 15. The cooling element 15 serves for the additional dissipation of the heat produced during operation of the laser light source 3. The cooling element 15 is arranged on the carrier element 5 or connected thereto. Due to the integral embodiment of cooling element 15 and carrier element 5, an optimal heat transfer is provided. The cooling element 15 is formed as a heat sink or as a ventilation device, that is to say serves either purely to dissipate heat, for example by surface enlargement by means of cooling ribs, or a coolant is actively supplied to the laser light source 3, for example by water cooling or a fan.

The luminous element 4 is spherical; it is a phosphor converter, which is excited by irradiation with laser light to radiate visible, preferably white light. The luminous element 4 thus donates white light functionally. The spherical embodiment is just one of a number of variants for forming the luminous element 4.

The optical element 9 is formed from a predominantly transparent material, such as glass or plastic, and has a receptacle for the luminous element 4, for example a blind bore 10 or a cavity surrounded on all sides by the optical element 9. The luminous element 4 is thus protected against ambient influences.

The luminous element 4 is assigned at least one reflective reflection layer 8 on a side facing away from the laser light source 3. The reflection layer 8 is formed as a coating on the side of the optical element 9 facing away from the laser light source 3. For example, the coating is performed by vapour deposition, painting or fastening of a separate reflection element. The reflection layer 8 reflects light in the direction of the laser light source 3. Light emitted by the luminous element 4 in the direction facing away from the laser light source is thus made usable and at the same time is optically pre-formed. A light-impermeable absorption layer 12 is also applied to the reflection layer 8. This absorption layer 12 serves as protection in order to prevent an occurrence of laser radiation or of white light when light passes through the reflection layer 8 (for example when this reflection layer is too thin at some points due to the production process). In a variant of the invention, just one absorption layer 12 can also be provided—in this case the light is not optically pre-formed and reflected in the direction of the laser light source 3, but is only shielded.

Depending on the embodiment of the side of the optical element 9 facing away from the laser light source 3 and depending on the embodiment of the reflection layer 8, various light functions can be provided. For example, the side of the optical element 9 facing away from the laser light source 3 (that is to say the outer face) can be formed in such a way that it has at least one focal point and the receptacle formed as a blind bore 10 is arranged such that the luminous element 4, when introduced into the receptacle, comes to lie in one of these focal points or in the vicinity thereof. To this end, said outer face of the optical element 9 (and therefore also the reflection layer 8) is preferably formed as a free-form face. The embodiment of a free-form face is known to a person skilled in the art.

In a variant, the outer face and therefore the reflection layer 9 applied thereto is formed such that light above, below and to the side in the vicinity of the luminous element 4 is reflected and contributes to a virtual enlargement of the light source or of the luminous element 4—the luminous element 4 in this variant is virtually surrounded by a ring of reflected light. The reflection layer 8 thus conducts the light reflected thereby predominantly past the luminous element.

A variant of the invention is illustrated in a dashed manner in FIG. 1: a light-impermeable screen device 13 is arranged on the side of the optical element 9 facing the laser light source 3. This screen device 13 is illustrated by means of a dashed line in FIG. 1. In the illustrated exemplary embodiment, the screen device 13 is arranged in a region below a horizontal plane 200 running through the luminous element 4. The horizontal plane 200 runs in FIG. 1 normal to the drawing plane and is illustrated as a dot-and-dash line. Of course, other embodiments are also possible depending on the desired light function.

The screen device 13 can be formed arbitrarily, for example as a light-impermeable coating or as a separate screen, which is glued to the optical element 9 or fitted thereto in another way or is mechanically held thereon. The screen device 13 allows the generation of a light/dark transition, whereby various light functions, such as dipped beam, fog light, etc., can be provided.

Figure 2:
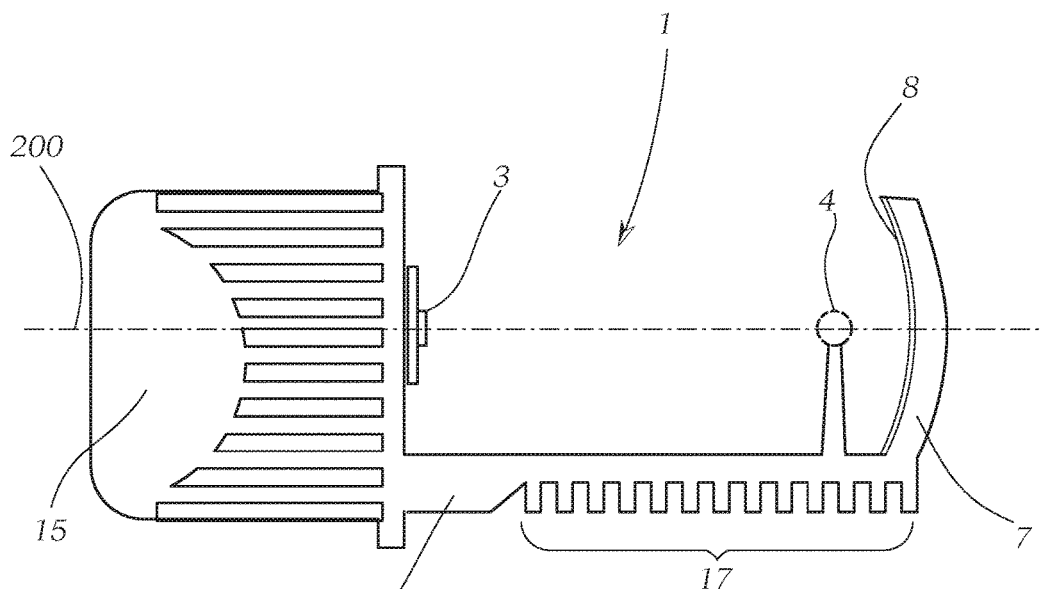

A further variant of the light source module 1 according to the invention is illustrated in FIG. 2. In this case, instead of the optical element 9 from FIG. 1, a concentrator optical element 7 arranged on the carrier element 5 and connected thereto is provided and is arranged on the side of the luminous element 4 facing away from the laser light source 3. The luminous element 4 is positioned via a mount (not defined in greater detail), possibly surrounded by an encapsulation, which protects the luminous element 4 against ambient influences.

The concentrator optical element 7 is used on the one hand to shield the luminous element in the mounted state, when the light source module 1 is installed for example in a vehicle headlight 2, in the main radiation direction 100 of the vehicle headlight 2 (see FIG. 6 or 7). On the side of the concentrator optical element 7 facing the luminous element 4, a reflection layer 8 is also arranged, which returns the light in the direction of the laser light source 3 and pre-forms said light optically. For optical pre-forming, the surface of the concentrator optical element 7 may also be formed in such a way that it has at least one focal point, wherein the luminous element 4 is preferably arranged in this focal point. To this end, the surface can be formed as a free-form face in a known manner.

The concentrator optical element 7 can be manufactured for example from glass or plastic—an absorption layer 12 may then have to be provided in addition to the reflection layer 8 in order to prevent light from passing through the concentrator optical element 7. The concentrator optical element 7 is favourably manufactured from a light-impermeable material, such as metal or plastic, but in a variant can also be manufactured in one piece with the carrier element 5. This variant is illustrated in FIG. 2.

FIG. 3 shows a variant of the invention in which a light guiding element 14 is arranged between the laser light source 3 and the luminous element 4, which is also arranged here in an optical element 9. This constitutes an alternative to the free-beam concept from FIGS. 1 and 2—the laser light is guided in the light guiding element 14 from the laser light source 3 to the luminous element 4. The light guiding element 14 consists of a light guiding material, for example plastic or Plexiglass, and can be formed arbitrarily, for example can be tubular, semi-tubular (in the form of a half-pipe), conical or cylindrical. An embodiment as a funnel-shaped concentrator element, for example made of glass, is also possible.

Irregularities, such as microstructures or imperfections in the element interior, can also be provided in or on the light guiding element 14 and scatter the laser light and thus make it visible from outside. By way of example, FIG. 3 shows wave structures 21 on the upper side of the light guiding element 14. Depending on the intended field of use, the light source module can thus be used creatively or as a design element. By way of example, with use of an additional coloured, for example blue, laser light source or LED, which is directed to the microstructures, a blue glow can be produced.

FIGS. 4 and 5 show perspective views of further variants of the light source module 1 according to the invention. A luminous element 4 with a laser light source 3 directed thereto is also illustrated again in these figures. The laser beam 19 between the laser light source 3 and luminous element 4 is sketched.

In this variant, the carrier element 5 consists of a carrier base 50, in which the laser light source 3 is arranged, and a carrier arm 51, extending from the carrier base 50 and comprising the luminous element 4. The carrier arm is formed in a U shape starting from the carrier base 50 in accordance with the illustrated exemplary embodiment. The luminous element 4 is located on the side of the carrier arm 51 facing the laser light source 3 at the position furthest from the carrier base 50.

The luminous element 4 is arranged in a concentrator optical element 7 similarly to FIG. 2. In the region around the luminous element 4 (not visible in FIG. 4), the carrier element 5 has an absorber region 18, which has an absorbing or non-reflective surface. This absorber region 18 is used for safety: when there is a malfunction of the light source module 1 for reasons not defined in greater detail (that is to say, for example, when the luminous element 4 is destroyed or removed or the concentrator optical element 7 breaks), the laser beam 19 from the laser light source 3 does not impinge on a reflective surface or is not deflected directly into the environment surrounding the light source module 1 or the vehicle headlight 2 (see FIGS. 6 and 7), but impinges on the absorber region 18 and is absorbed there.

In addition, further safety measures are also possible: sensor elements for detecting a malfunction of the laser light source 3 and/or of the carrier element 5 can be arranged on the carrier element 5. Malfunctions include, for example, the above-described defects of the laser light source 3 or of the luminous element 4 or a break of the carrier element 5 due to mechanical influence. In the case of a detected malfunction, the laser light source 3 can then be switched off. The recordings of the sensor element are to be evaluated accordingly or fed into the vehicle safety system.

By way of example, said sensor elements may consequently be an optical sensor for detecting a deviation of the laser light emitted by the laser light source 3 from the normal direction of radiation, an optical sensor for detecting malfunctions of the luminous element 4, or a mechanical sensor for detecting damage to the carrier element 5 and/or to the luminous element 4 and/or to the optical element 9 or to the concentrator optical element 7. An optical sensor 16 for monitoring the laser beam 19 is illustrated by way of example in FIGS. 4 and 5. For example, the optical sensor 16 may be a photocell. The optical sensor 16 in the illustrated exemplary embodiment is positioned behind the concentrator optical element 7, such that it is then contacted by the laser beam 19 when the concentrator optical element 7 breaks. As mentioned above, a multiplicity of other embodiments are also possible.

As an additional safety measure, the light source module 1 may have at least one safety switch device, which prevents an activation of the light source module 1 or of the laser light source 3 of the light source module 1 prior to complete installation of the light source module 1 in a vehicle headlight 2 or a reflector 6 or reflector adaptor of a vehicle headlight 2. Here, this safety switch device may be a contact switch for example, which releases the start-up of the laser light source 3 only in the correct position in the vehicle headlight 2 or in the reflector 6 of a vehicle headlight. Further possibilities include a coding resistor or a bridge, which can be integrated (mechanically and/or electronically) in the cable loom or in the photometric unit and which only releases the start-up when the vehicle headlight 2 or the lighting module 1 are installed in the vehicle. Safety switch devices of this type are not illustrated in the figures.

FIG. 6 now shows a sectional view of a light source module 1 according to the invention, which is arranged in a vehicle headlight 2. Here, the light source module 1 is that according to FIG. 1. The vehicle headlight 2 has a reflector 6, into which the light source module 1 can be introduced. The light source module 1 is formed such that, in the mounted state, the luminous element 4 is arranged in a focal point of the reflector 6. An optimal utilisation of the light emitted by the luminous element 4 can thus be ensured. In the illustrated exemplary embodiment, the light source module 1 is mounted such that the cooling element 15 associated with the laser light source 3 is arranged outside the reflector 6. Since the cooling element 15 is connected in a thermally conductive manner to the carrier element 5, an optimal dissipation of the heat from the reflector 6 is thus ensured.

As can be seen in FIG. 6, it is ensured by the light-impermeable reflection layer 8 of the optical element 9 that no light is irradiated in the main radiation direction of the vehicle headlight 2 and also that the laser light cannot escape in this direction. This is also ensured when the luminous element 4 is no longer in its position. It can be seen in FIG. 6 that, in the main radiation direction 100 of the vehicle headlight 2, light is radiated directly from the luminous element 4 via the reflector 6 ("A" in FIG. 6) and light is also deflected from the luminous element 4 via the reflection layer 8 of the optical element 9 to the reflector 6 of the vehicle headlight 2 ("B" in FIG. 6).

FIG. 6 further shows that the means for detachably mounting the light source module 1 in the headlight 2 may comprise reference means, which in the present exemplary embodiment are formed as dowel pins, which cooperate with dowel holes. More specifically, dowel pins 5' and dowel holes 5" on the one hand are provided on a flange integral with the carrier element 5 of the light source module 1, and dowel holes 6" and dowel pins 6' on the other hand are provided on a flange of the reflector 6 of the headlight 2. In the present case, a dowel pin 5' is provided on the module 1 or the carrier element 5 and a dowel pin 6' is provided on the headlight 2, however other embodiments are of course possible, in which for example dowel pins are formed exclusively on the light source module 1 and dowel holes are formed exclusively on the headlight, or vice versa.

In addition to the reference means, that is to say in this case the dowel pins and the dowel holes, further means for detachable mounting can of course also be provided, such as clips, snap-fit connections, etc.

A further variant of a light source module 1 according to the embodiment in FIG. 4 installed in a vehicle headlight 2 is illustrated in a perspective view in FIG. 7. In this case, the light source module 1 is arranged in a reflector 6, wherein design elements 20 are provided in addition to the light source module 1.

The light source module 1 is introduced in both illustrated variants along the main axis 300 (only illustrated in FIG. 6) of the reflector 6 and is anchored using means for detachable mounting—for example, these may be detent elements that cooperate with corresponding detent receptacles in the reflector 6. The means for detachably mounting the light source module 1 are preferably arranged on the carrier element 5 thereof. A number of such solutions are known from the prior art and therefore will not be described here in greater detail.

In order to ensure, when installing or changing the light source module 1, that the optimal positioning of the module or luminous element 4 thereof are ensured, the light source module 1 and/or the laser light source 3 has reference means for referencing the light source module 1 and/or the laser light source 3 in the vehicle headlight 2 or in the reflector 6 thereof.

The reference means can be formed differently—for example, in accordance with a first variant, the reference means may be guide devices that cooperate with corresponding guide receptacle devices in the vehicle headlight 2 or in the reflector 6 or reflector adaptor thereof. To this end, rails may be provided in the opening through which the light source module 1 is introduced into the vehicle headlight 2, said rails cooperating with corresponding slots on the light source module 1 and guiding this, for example as far as a detent stop. Such solutions are known in the prior art and therefore will not be described here in greater detail.

In a variant, the reference means are formed as a reference plane which is formed on the laser light source 3 and/or the carrier element 4 and has at least three bearing surfaces, which cooperate with corresponding bearing surface receptacles on the vehicle headlight 1, in particular on the reflector 6 of a vehicle headlight 1.

The invention claimed is:

1. A light source module (1) for a vehicle headlight (2), the light source module (1) comprising:
    at least one laser light source (3);
    at least one luminous element (4) which is configured to be excited by illumination with laser light to emit visible light and which is configured to be irradiated by the laser light source (3);
    a carrier element (5) on which the laser light source (3) and the luminous element (4) are arranged spaced apart from one another; and
    a means, which is arranged on the carrier element (5), for detachable mounting of the light source module (1) into the vehicle headlight (2), wherein the means for detachable mounting comprise reference means (5', 6'; 5", 6") for referencing at least one of the light source module (1) and the laser light source (3) in the vehicle headlight (2), wherein the reference means are formed on at least one of the laser light source (3) and the carrier element (5), which cooperate with corresponding bearing surface receptacles on the vehicle headlight (2),
    wherein the luminous element (4) is arranged on the carrier element (5) in such a way that the luminous element is arranged in the mounted state in a focal point of a reflector (6) of the vehicle headlight (2).

2. The light source module (1) according to claim 1, wherein the reference means are formed as guide devices cooperating with corresponding guide receptacle devices in the vehicle headlight (2).

3. The light source module (1) according to claim 1, wherein the reference means are formed as at least one dowel pin and at least one dowel hole, wherein the dowel pin is arranged on at least one of the laser light source (3) and the carrier element (5) and the dowel hole is arranged on the vehicle headlight (2), or vice versa.

4. The light source module (1) according to claim 1, wherein the carrier element (5) is manufactured at least in part from at least one of a heat-conducting material and a transparent material.

5. The light source module (1) according to claim 1, further comprising a concentrator optical element (7) arranged on the carrier element (5) and provided on the side of the luminous element (4) facing away from the laser light source (3), wherein the concentrator optical element (7) shields the luminous element (4) in the mounted state in the main radiation direction (100) of the vehicle headlight (2) and has a reflection layer (8) on the side thereof facing the luminous element (4).

6. The light source module (1) according to claim 1, wherein at least one optical wave guide element (14) is arranged between the laser light source (3) and the luminous element (4).

7. The light source module (1) according to claim 1, wherein the laser light source (3) is connected to at least one cooling element (15).

8. The light source module (1) according to claim 7, wherein the cooling element (15) connected to the laser light source (3) is arranged on the carrier element (5).

9. The light source module (1) according to claim 7, wherein the at least one cooling element (15) is formed as at least one of a heat sink and ventilation device.

10. The light source module (1) according to claim 1, further comprising at least one safety switch device, which prevents an activation of the light source module (1) or of the laser light source (3) of the light source module (1), prior to complete installation of the light source module (1) in the vehicle headlight (2).

11. The light source module (1) according to claim 1, wherein the bearing surfaces cooperate with corresponding bearing surface receptacles on a reflector (6) of the vehicle headlight (2).

12. A light source module (1) for a vehicle headlight (2), the light source module (1) comprising:
    at least one laser light source (3);
    at least one luminous element (4) which is configured to be excited by illumination with laser light to emit visible light and which is configured to be irradiated by the laser light source (3);
    a carrier element (5) on which the laser light source (3) and the luminous element (4) are arranged spaced apart from one another, wherein the luminous element (4) is arranged in an optical element (9) arranged on the carrier element (5), wherein the optical element (9), at least on a side facing away from the laser light source (3), is assigned at least one of a reflection layer (8) reflecting light in the direction of the laser light source (3) and at least one light-impermeable absorption layer (12); and
    a means, which is arranged on the carrier element (5), for detachable mounting of the light source module (1) into the vehicle headlight (2),
    wherein the luminous element (4) is arranged on the carrier element (5) in such a way that the luminous element is arranged in the mounted state in a focal point of a reflector (6) of the vehicle headlight (2).

13. The light source module (1) according to claim 12, wherein the side of the optical element (9) facing the laser light source (3) is covered at least in part, by a light-impermeable screen device (13).

14. The light source module (1) according to claim 13, wherein the side of the optical element (9) facing the laser light source (3) is covered at least in a region below a horizontal plane (200) running through the luminous element (4) with a light impermeable coating or other light-impermeable screen device (13).

15. The light source module (1) according to claim 12, wherein the optical element (9) is arranged on the carrier element in a blind bore (10) or in a cavity.

16. A light source module (1) for a vehicle headlight (2), the light source module (1) comprising:
    at least one laser light source (3);
    at least one luminous element (4) which is configured to be excited by illumination with laser light to emit visible light and which is configured to be irradiated by the laser light source (3);
    a carrier element (5) on which the laser light source (3) and the luminous element (4) are arranged spaced apart from one another, wherein the carrier element (5) has at least one carrier base (50) with at least one laser light source (3) and at least one carrier arm (51) extending from the carrier base (50) and comprising at least one luminous element (4); and
    a means, which is arranged on the carrier element (5), for detachable mounting of the light source module (1) into the vehicle headlight (2),
    wherein the luminous element (4) is arranged on the carrier element (5) in such a way that the luminous element is arranged in the mounted state in a focal point of a reflector (6) of the vehicle headlight (2).

17. The light source module (1) according to claim 16, wherein the carrier arm (51) is formed in a U shape starting from the carrier base (50), wherein the at least one luminous element (4) is arranged on the side of the carrier arm (51) facing the laser light source (3) in the position furthest from the carrier base (50).

18. A light source module (1) for a vehicle headlight (2), the light source module (1) comprising:
   at least one laser light source (3);
   at least one luminous element (4) which is configured to be excited by illumination with laser light to emit visible light and which is configured to be irradiated by the laser light source (3);
   a carrier element (5) on which the laser light source (3) and the luminous element (4) are arranged spaced apart from one another;
   at least one sensor element (16) is arranged on the carrier element (5) for detecting a malfunction of at least one of the laser light source (3), the carrier element (5), and the luminous element (4); and
   a means, which is arranged on the carrier element (5), for detachable mounting of the light source module (1) into the vehicle headlight (2),
   wherein the luminous element (4) is arranged on the carrier element (5) in such a way that the luminous element is arranged in the mounted state in a focal point of a reflector (6) of the vehicle headlight (2).

19. The light source module (1) according to claim 18, wherein the sensor element (16) is at least one of the following sensor devices:
   an optical sensor for detecting a deviation of the laser light emitted by the laser light source (3) from the normal radiation direction;
   an optical sensor for detecting malfunctions of the luminous element (4); and
   a mechanical sensor for detecting damage to at least one of the carrier element (5), the luminous element (4), an optical element (9), and a concentrator optical element (7).

20. A light source module (1) for a vehicle headlight (2), the light source module (1) comprising:
   at least one laser light source (3);
   at least one luminous element (4) which is configured to be excited by illumination with laser light to emit visible light and which is configured to be irradiated by the laser light source (3);
   a carrier element (5) on which the laser light source (3) and the luminous element (4) are arranged spaced apart from one another, wherein the carrier element (5), in the region around the luminous element (4), has an absorber region (18) with an absorbing or non-reflective surface; and
   a means, which is arranged on the carrier element (5), for detachable mounting of the light source module (1) into the vehicle headlight (2),
   wherein the luminous element (4) is arranged on the carrier element (5) in such a way that the luminous element is arranged in the mounted state in a focal point of a reflector (6) of the vehicle headlight (2).

21. A light source module (1) for a vehicle headlight (2), the light source module (1) comprising:
   at least one laser light source (3);
   at least one luminous element (4) which is configured to be excited by illumination with laser light to emit visible light and which is configured to be irradiated by the laser light source (3);
   a carrier element (5) on which the laser light source (3) and the luminous element (4) are arranged spaced apart from one another; and
   a means, which is arranged on the carrier element (5), for detachable mounting of the light source module (1) into the vehicle headlight (2), wherein the means for detachable mounting comprise reference means (5', 6'; 5", 6") for referencing at least one of the light source module (1) and the laser light source (3) in the vehicle headlight (2), wherein the reference means (5', 6'; 5", 6") reference at least one of the light source module (1) and the laser light source (3) in a reflector (6) of the vehicle headlight (2),
   wherein the luminous element (4) is arranged on the carrier element (5) in such a way that the luminous element is arranged in the mounted state in a focal point of a reflector (6) of the vehicle headlight (2).

22. A light source module (1) for a vehicle headlight (2), the light source module (1) comprising:
   at least one laser light source (3);
   at least one luminous element (4) which is configured to be excited by illumination with laser light to emit visible light and which is configured to be irradiated by the laser light source (3);
   a carrier element (5) on which the laser light source (3) and the luminous element (4) are arranged spaced apart from one another; and
   a means, which is arranged on the carrier element (5), for detachable mounting of the light source module (1) into the vehicle headlight (2), wherein the reference means are formed as guide devices cooperating with corresponding guide receptacle devices in the vehicle headlight (2), wherein the guide devices cooperate with corresponding guide receptacle devices in a reflector (6) of the vehicle headlight (2),
   wherein the luminous element (4) is arranged on the carrier element (5) in such a way that the luminous element is arranged in the mounted state in a focal point of a reflector (6) of the vehicle headlight (2).

23. A vehicle headlight (2) comprising at least one light source module (1) for a vehicle headlight (2), the light source module (1) comprising:
   at least one laser light source (3);
   at least one luminous element (4) which is configured to be excited by illumination with laser light to emit visible light and which is configured to be irradiated by the laser light source (3);
   a carrier element (5) on which the laser light source (3) and the luminous element (4) are arranged spaced apart from one another;
   at least one reflector (6) is provided and is attachable to the light source module (1); and
   a means, which is arranged on the carrier element (5), for detachable mounting of the light source module (1) into the vehicle headlight (2),
   wherein the luminous element (4) is arranged on the carrier element (5) in such a way that the luminous element is arranged in the mounted state in a focal point of a reflector (6) of the vehicle headlight (2).

* * * * *